(12) United States Patent
Descloux

(10) Patent No.: US 7,135,118 B2
(45) Date of Patent: Nov. 14, 2006

(54) METHOD FOR TREATMENT AGAINST CORROSION AND DEPOSITIONS IN DOMESTIC SUPPLY WATER STALLATIONS

(76) Inventor: Pierre Descloux, 18, chemin Fontaine, CH-1292 Chambésy (CH)

( * ) Notice: Subject to any disclaimer, the term of this patent is extended or adjusted under 35 U.S.C. 154(b) by 70 days.

(21) Appl. No.: 10/491,181

(22) PCT Filed: Oct. 3, 2001

(86) PCT No.: PCT/CH01/00595

§ 371 (c)(1),
(2), (4) Date: Mar. 30, 2004

(87) PCT Pub. No.: WO03/028910

PCT Pub. Date: Apr. 10, 2003

(65) Prior Publication Data

US 2004/0238450 A1    Dec. 2, 2004

(51) Int. Cl.
*C02F 5/08* (2006.01)
(52) U.S. Cl. ............ 210/696; 210/739; 210/743; 422/3; 422/18
(58) Field of Classification Search .......... 210/696; 422/3
See application file for complete search history.

(56) References Cited

U.S. PATENT DOCUMENTS

| | | | | |
|---|---|---|---|---|
| 3,669,615 A | * | 6/1972 | Murray | 422/18 |
| 4,313,042 A | * | 1/1982 | Ehrhart | 200/61.04 |
| 5,236,600 A | * | 8/1993 | Hutchins | 210/739 |
| 5,855,791 A | * | 1/1999 | Hays et al. | 210/696 |
| 5,895,565 A | * | 4/1999 | Steininger et al. | 210/85 |
| 6,587,753 B1 | * | 7/2003 | Fowee | 700/266 |
| 6,589,461 B1 | * | 7/2003 | Hansen et al. | 264/109 |
| 7,036,559 B1 | * | 5/2006 | Stanimirovic | 165/11.1 |

FOREIGN PATENT DOCUMENTS

| | | |
|---|---|---|
| DE | 19755622 A | 6/1999 |
| DE | 10060164 A | 5/2001 |

* cited by examiner

Primary Examiner—Peter A. Hruskoci
(74) Attorney, Agent, or Firm—Clifford W. Browning; Krieg Devault LLP

(57) ABSTRACT

The invention concerns a method for preventive treatment of corrosion, oxidation and/or depositions in domestic supply water distribution circuits, comprising steps which consist in: a diagnosis including an analysis of the state of corrosion, oxidation, depositions of the domestic supply water distribution circuit and an analysis of chemical elements of the water flowing in said circuit by sampling water flowing in said circuit; and preventive treatment of corrosion, oxidation and/or depositions of the domestic supply water distribution circuit by operating a treatment unit (3) measuring the flow rate of water entering the domestic supply water distribution circuit (2), and injecting a treatment product comprising silicates in an amount substantially proportional to the volume of water entering the domestic supply water distribution circuit, but not exceeding the feeding standards and adjusted on the basis of the result of the analysis of chemical elements of the water flowing in said circuit.

9 Claims, 1 Drawing Sheet

Figure 1:
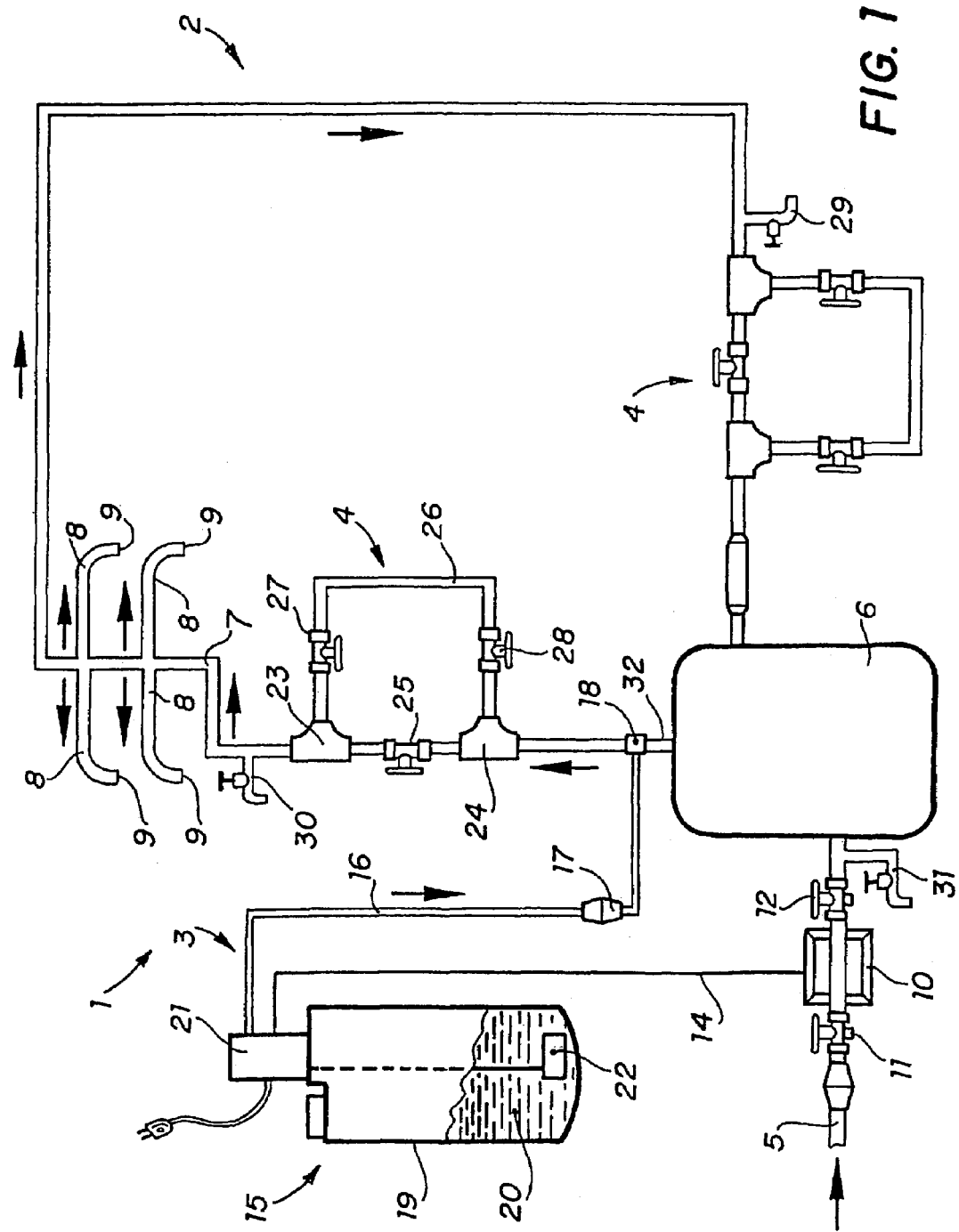

METHOD FOR TREATMENT AGAINST CORROSION AND DEPOSITIONS IN DOMESTIC SUPPLY WATER STALLATIONS

The present invention relates to a method for treatment against corrosion, oxidation and depositions in domestic water supply installations and circuits, as well as an apparatus for carrying out the method.

A number of methods are currently known for cleaning chemically the inner surfaces of metal storage tanks and/or of metal conduits for circulating fluids, and which make it possible to control corrosion, oxidation as well as various other types of deposits, such as scale, once their presence has been verified.

Generally speaking, these methods include a preliminary step of diagnosing the occurrence of such corrosions, oxidations and depositions, either by the analysis of certain chemical components contained in the stored fluid or in the circulating fluid, or by cutting out, for instance, a portion of the conduits which are to be cleaned in order to determine the nature and the proportion of the different deposits formed, as well as the nature of the walls of the portion of the conduits which was cut out, as described in the patent CH 640 434. Depending on the results of the analyses carried out, a destructive treatment product is selected, such as a dissolving or a deoxidising solution, of a composition capable of destroying the deposits found, as well as various parameters relating to the conditions of its circulation, such as its temperature, its flow rate and the duration of the destructive treatment.

The above-mentioned diagnosis step requires the intervention of a technician for cutting out a portion of the conduits to be cleaned as well as the intervention of a chemist for the different analyses which need to be carried out, both of the fluid being stored or circulated and of the walls of the portion of the conduits which was cut out.

Furthermore, according to different prior art methods, the step of carrying out the chemical cleaning by circulating a destructive treatment product in an installation in which deposits were found must be preceded and followed by several complicated time consuming operations, which need to be carried out by a staff which is well trained in different technical fields.

Thus, the circulation of the treatment product implies a preliminary purge step, generally carried out by drainage and rinsing, for instance of a section of the conduits which is to be cleaned. This purge step must be followed by a step of forming a closed circuit including, for example, the section of the conduits which is to be cleaned, a filter, a pump for feeding the treatment product and means for measuring the pressure and the heating, in order to control the conditions of circulation of the treatment product.

After having circulated the treatment product, it is necessary to carry out a step of circulating a neutralising solution, in order to neutralise the effects of the solution used for the dissolution or the deoxidising and, should the need arise, a step of circulating a protective substance capable of forming a protective layer on the inner surfaces or walls of the storage tanks or of the conduits which were cleaned, a step of disconnecting the closed circuit which was formed, a step of reconnecting the section of the conduits which was cleaned, to the fluid circuit and a step of restoring the flow of the fluid in the section which was cleaned.

All the prior art methods resort to a destructive treatment and are carried out once deposits are found to have formed. In other words, these methods are implemented at specific points of time and they do not provide any long-term solution neither for destroying durably the deposits formed nor for preventing their formation.

Furthermore, the decision of carrying out a destructive treatment is taken when deposits are found to have formed and this takes place, in most instances, only when the functioning of the installations concerned becomes defective or when they suffer a failure. Accordingly, these installations will operate inadequately both before the defect or the failure has been detected, because of the decreased efficiency arising from the progressive accumulation of deposits and also at the time of occurrence of said defects or of said failures, when repeated breakdowns occur as a result thereof. Furthermore, the choice of the appropriate time for initiating a destructive treatment, (desirably before the occurrence of a failure or of a breakdown), is necessarily based on a subjective human judgment, since there is no possibility of being warned about the extent of the deposits which had formed.

The invention is aimed at remedying the drawbacks of existing treatment methods and, specifically, at reducing the interventions associated with a destructive treatment and, more particularly at avoiding interrupting the domestic water supply of a building.

Advantageously, the invention provides a reliable treatment method for hot water and for cold water, which increases the service life of a domestic water supply circuit and which makes it possible to carry out inspections without interrupting the domestic water supply.

Another objective of the invention is to provide a treatment unit for carrying out the treatment method, which can be installed on a domestic water supply installation of a new building or of an existing building and which increases the service life of the domestic water supply installation.

It is advantageous to provide a treatment unit which reduces the time needed for carrying out inspections or for carrying out repairs, in the case of a breakdown of the installation.

In the present invention, the preventive method of treatment of corrosion, oxidation, and/or of depositions in domestic water supply circuits comprises the steps of:
  carrying out a diagnosis including an analysis of the state of the corrosion, of the oxidation and of the depositions in the domestic water supply circuit as well as an analysis of chemical parameters of the water flowing in said circuit, by sampling the water flowing in said circuit; and
  carrying out a preventive treatment against corrosion, oxidation and/or depositions in said domestic water supply circuit, implemented by a treatment unit, which measures the flow rate of the water entering the domestic water supply circuit and which injects a treatment product comprising silicates, in an amount substantially proportional to the volume of water entering the domestic water supply circuit, but chosen so as not to exceed the limits fixed by food regulations and adjusted on the basis of the results of the analysis of chemical parameters of the water flowing in said circuit.

Advantageously, the method according to the invention increases the service life of the domestic water supply circuit, by reducing or by eliminating the need for a destructive treatment, while allowing the domestic water supply to remain in operation.

Advantageously, the domestic water supply circuit can include control devices positioned at the beginning of the circuit and also at the end of the circuit, each control device including a by-pass valve and a control tube mounted in parallel with respect to the by-pass valve and allowing a visual and a chemical assessment of the deposits in the control tube. The control tubes are made of materials similar to those of the conduits of the water supply circuit of the building. Valves provided at the ends of the control tubes and the by-pass valve make it possible to remove the control tubes without interrupting the flow of water in the water supply circuit of the building.

In the present invention, the treatment unit of the domestic water supply circuit includes a device for measuring the flow rate, which is mounted at the inlet side of a domestic water supply circuit of a building, a storage tank containing a treatment product, a pump with a control unit connected electrically to the device for measuring the flow rate and a tube for supplying the treatment product, connected at a point of connection with the domestic water supply circuit. The treatment unit is controlled in such a manner as to inject the treatment product in an amount substantially proportional to the volume of water entering the domestic water supply circuit and at a dose such as not to exceed the limits fixed by food regulations.

The supply tube for the treatment product is connected to the water supply circuit at a location, which is intermediate between a heat exchanger (when the circuit supplies hot water) and a control device including a control tube, which can be disassembled for the purpose of evaluating the corrosion and the deposits in the conduits. A thermostat positioned at the outlet side of the heat exchanger makes it possible to maintain the temperature of the hot water at about 60° C. or less, in order to limit a possible crystallisation phenomenon of the treatment product and to thus ensure a good distribution thereof throughout the conduits of the circuit.

The treatment unit can include a device for measuring the flow rate, which includes a pulse-emitting meter. After the influx into the domestic water supply circuit of a specified volume of water, a pulse sent by the device for measuring the flow to the pump actuates the injection of a specified amount of the treatment product into the water circuit. A non-return valve is provided on the tube for supplying the treatment product, at some distance from its connection to the water circuit, in order to avoid a crystallisation of the treatment product, which could occur as a result of an excessive temperature generated by the heat of the hot water circuit.

Other characteristic features, objects and advantages of the invention will become apparent from the claims, from the description and from the appended drawing, in which:

FIG. 1 is a general schematic drawing of a domestic water supply circuit of a building including an installation for the treatment of domestic water according to the present invention.

As illustrated in FIG. 1, an installation 1 for the supply of domestic water in a building includes a domestic water supply circuit 2, a treatment unit 3 and one or several control devices 4.

The domestic water supply circuit 2 includes a water inlet 5, a heat exchanger 6, for example of the boiler or of the water heater type (in the case of an installation providing hot water), metal pipes 7 for re-circulating the hot water via a loop and branch conduits 8 which make it possible to dispatch the water to the points 9 where it is made available to the users.

In the case of an installation providing cold water, the heat exchanger 6 can be advantageously replaced by a cold-water storage tank.

The treatment unit 3 includes a device 10 for measuring the flow rate of the water, a device 15 for supplying a treatment product, connected to the device 10 for measuring the flow rate of the water, via an electrical cable 14, a supply tube 16, a non-return valve 17 and a connection 18 which ensures the connection of the treatment unit 3 with the domestic water supply circuit 2. The device 15 for supplying the treatment product includes a storage tank 19, which contains a treatment product 20, a pump with a control unit 21 and a suction strainer 22. Two valves 11, 12 are provided one on each side of the device 10 for measuring the flow rate of the water, so that it may be isolated.

Each control device 4 includes two connections 23, 24, a by-pass valve 25, a control tube 26, for example shaped as a "U" and two valves 27, 28 one at each end of the control tube.

More specifically, the location of the treatment unit must be selected in such a manner as to satisfy various criteria, in particular standards relating to the safety of electricity supply devices and to hygiene, criteria relating to the ease of access for cleaning and maintenance and various criteria relating to the operational reliability and accuracy, for example ensuring that the unit is not exposed to the disruptive effects caused by a heat source or by a low air intake located in close vicinity thereof.

The treatment unit 3 functions in such a manner as to dose and inject the treatment product in an amount determined as described hereafter, into the domestic water supply circuit 2. This device must be made tamper proof and not be affected by the pressure variations occurring in the water which flows in the domestic water supply circuit 2, in order to, on the one hand, guarantee the safety of the operations and, on the other hand, ensure permanently and precisely, the supply of a determined amount of the treatment product, independently of the pressure disturbances occurring in the domestic water supply circuit 2.

The device 10 for measuring the flow rate of the water entering the domestic water supply installation 1 of the building sends this information to a unit 21 actuating the pump. The device 10 for measuring the flow rate of the water sends an actuation signal after having measured a certain volume of water, selected on the basis of specific criteria, such as the quality of the water, the degree of hardness of the water, the concentration and the properties of the treatment product, the size of the domestic water supply installation to be treated and the materials from which the domestic water supply circuit 2 is made. Upon reception of the actuation signal, the device 15 for supplying the treatment product draws from the storage tank 19 the calculated amount of the treatment product, via the suction strainer 22, which functions as a suction means, a filtering means and a level contact. The treatment product, sampled and drawn according to the amount calculated is filtered and driven by the pumping action of the pump provided with a control unit 21 into the domestic water supply circuit 2, to be injected therein. The supply water, to which the treatment product was added in an amount proportional to its flow rate, then flows through the domestic water supply circuit 2.

The device 10 for measuring the flow rate of the water includes a meter with a head emitting direct-read pulses, mounted without any by-pass between the two isolating valves 11, 12. The pulse emitting head emits pulses in response to the effective flow rate of the water and these pulses are sent to the device 15 for supplying the treatment product. The device 15 for supplying the treatment product was adjusted by successive approximations during the starting operation of the treatment unit, in such a manner as to feed preferably between 110 and 120 millilitres of treatment product per cubic meter of water at the actual back pressure prevailing in the domestic water supply circuit 2. According to the pulses received, which actually mirror the flow rate of the water entering the domestic water supply circuit 2, the device 15 for supplying the treatment product injects into the domestic water supply circuit 2 an amount of treatment product which is proportional to the volume of water which is to be treated and which flows in the domestic water supply circuit 2.

Advantageously, the operational range of the meter is selected so as to match the diameter of the main water inlet, in order to ensure a good sensitivity in the range of the flow rates prevailing in the domestic water supply circuit and to avoid that no pulses be generated, for example, when small volumes of supply water are drawn. Also and advantageously, a time-delayed relay with a proportionating device can be provided, in order to maintain the control of the device 15 for supplying the treatment product during an adjustable duration of time when the volume of water flowing between two pulses is high.

The device 15 for supplying the treatment product can include a conventional dosing pump, which is actuated by the above-mentioned pulses, to supply an amount of treatment product, which is adjustably proportional to these pulses.

The storage tank 19 has a wall which is made of a food grade material and which is tamper proof, except if destroyed. During the entire service life, the amount of the treatment product stored in the tank 19 must be sufficient to cover the needs thereof between two routine inspections of the installation and this amount is determined at the inspection carried out at the end of the shock treatment step. Should the amount of treatment product stored in the storage tank 19 become lower than a predetermined critical level, as a result of neglect or for some other reason (for example a failure in one of the component elements of the treatment unit 3), this would be detected by the suction strainer 22.

The non-return valve provided in the dosing pump functions to prevent the treatment product 20—which is drawn from the storage tank 19 via the suction strainer 22 into the supply tube 16 and to the connection, where it is injected into the domestic water supply circuit 2—from returning into the storage tank 19.

The second non return-valve 17 is placed at some distance from the connection 18 with the domestic water supply circuit, in order to prevent the crystallisation of the treatment product in the supply tube 16, because of the high temperature of the hot water flowing in the circuit.

The control devices 4 are designed for making it possible to analyse the state of corrosion, of oxidation and/or of deposition in the domestic water supply circuit 2 after its treatment by means of the treatment product 20 dosed and injected by the device 15 for supplying the treatment product, under the control of the device 10 for measuring the flow rate of the water. The by-pass valve 25 makes it possible to deviate the flow of the supply water into the control tube 26 during the normal operation of the installation, while the two valves 27 and 28 make it possible to isolate the control tube 26 so that it may be disassembled for analytical purposes.

The use of the control tubes provides a highly reliable method for evaluating the state of corrosion, of oxidation and/or of deposition in a circuit in which flows a fluid, without interfering with the flow of the water supplied to the building.

The control devices are distributed in the domestic water supply circuit 2 in such a manner as to make it possible to analyse—the most precisely possible—the state of the water circuit: preferably, there is provided at least one control device after the connection 18 of the supply tube 16, namely at the beginning of the circuit 2 and at least another control device is placed at the end of the circuit before the heat exchanger.

The tubes should be selected so as to match as well as possible the remainder of the circuit, in particular in terms of the material selected, of its ageing, of its corrosion, of its oxidation and/or of the depositions, for instance by choosing the control tubes so that they be comprised, in part, of the original tubes and, in part, of new tubes.

Furthermore, the control devices are positioned so as not to alter or modify the operational parameters of the domestic water supply circuit 2, for instance by creating low points at which depositions could occur which could accelerate corrosion and increase the pressure drop.

In order to facilitate the access to the control tubes for their regular inspection during the service life of the installation, the control tubes are preferably made to be easily recognised, for example by not carrying any thermal insulation or by being painted in a bright colour.

In order to facilitate the analysis of the control tubes, it is advantageous that they may be easily disassembled. To this end, they are preferably comprised of a straight section and of a bent section and the valves 28 provided for isolating them before their disassembling should be watertight and not generate any water hammer phenomena. Furthermore, the risks of being sprayed with water during disassembling can be avoided, for example by providing a purge 29 in the vicinity of the control device.

The treatment unit 3 is positioned in such a manner as to form an integral part of the domestic water supply circuit 2. It is designed for remaining in place for the entire service life of the domestic water supply circuit. After having been mounted on the circuit, made operational and calibrated, the treatment unit will function on a continuous basis to ensure a permanent preventive treatment during the service life of the domestic water supply circuit without any interruption for any reason whatsoever associated with the treatment unit itself. Advantageously, the treatment unit can also be used for a destructive treatment carried out against corrosion and depositions, at a selected point of time, for example before operating said unit after its installation in an existing domestic water supply system.

The determination of chemical parameters such as the silicates, the total iron, the pH and the degree of hardness or DH of the water which flows in the domestic water supply circuit 2 makes it possible to confirm the results obtained from the analysis of the control tubes and to improve their accuracy. To this end, the circuit includes sampling points 29, 30, 31, located in such a manner as to provide samples of the water at different stages of the treatment by the treatment product. Preferably, an inlet sampling point 31 is located immediately before the heat exchanger 6, so as to provide a sample of water, which has not yet been treated. An initial sampling point 30—which is located immediately after the control device 4 placed after the connection 18, in the direction of flow of the treatment product—makes it possible to sample and analyse the water shortly after the injection of the treatment product. A return sampling point 29 located before the control device 4 placed before the heat exchanger 6 (again in the direction of the flow of the treatment product) makes it possible to sample and analyse the water at the end of the recirculation loop.

The treatment product 20, used for preventive purposes, is preferably a ready-to-use aqueous solution based on sodium silicates and on de-ionised water. Preferably, the preventive treatment product has the following characteristics:

| silicates, expressed as g/l of $SiO_2$ | 73 g/l ± 7.3 g/l |
|---|---|
| specific mass at 20° C. | 1.07 g/cm³ |
| pH value, solution diluted to 1% in volume | =10 |

The silicates deposit on the walls of the conduits of the sanitary water system in fine layers which act as a protective film against oxidation and the deposition of limestone and of other minerals. At higher concentrations, this product has also a water-softening effect through sodium exchange and through an iron removing effect. In order to avoid a crystallisation of the treatment product and a good spreading of the protective film in the conduits of the water supply system, the point of injection, namely the connection 18 for the treatment product, is arranged downstream of the heat exchanger (rather than at the cold water inlet of the installation) and a thermostat can be provided between the heat exchanger 6 and the connection 18, for example in the intermediate position indicated by numeral 32, in order to ensure that the temperature of the hot water does not exceed 60° C.

In the case of the treatment apparatus described above being installed into an already existing domestic water supply installation 1, the treatment method will be implemented in three steps: a first step, in which a diagnosis is carried out to determine the degree of corrosion, of oxidation and of deposition in the domestic water supply circuit 2, a second step of implementing a destructive treatment of the corrosion, oxidation and depositions and a third step of implementing a preventive treatment for avoiding the reoccurrence of the same phenomena. In the case of the treatment apparatus being installed at the same time as the domestic water supply installation 1 is installed, only the third step will be implemented. Between the second and the third steps, inspections, for example inspections of the control tubes and/or of sampling points, can obviously be carried out for the purpose of better adjusting the amount of the treatment product, on the basis of the results obtained with the current treatment.

In the starting phase of operation of the treatment unit, an adjustment step needs to be carried out which takes into account the functioning of the meter and the actual number of injection pulses delivered by the pump at each pulse of the meter. To this end, the suction strainer 22 is placed into a graduated cylinder which had been filled with a predetermined amount of the treatment product 20 and a given number of pulses are produced manually or by allowing water to flow out of the mains. Comparing the amount of product drawn and the volume in m³ corresponding to the number of pulses makes it possible, by successive approximations, to adjust the functioning of the pump under the conditions of backpressure prevailing in the mains. The starting up instructions and the operation instructions can be recorded in writing on a sheet provided for this purpose.

When starting the installation for the first time, one can also carry out a "shock treatment" extending over a period of three months, during which at least 10% of the capacity of the domestic water supply circuit are drawn every day. At the end of these three months, a control is carried out including the operations of:

recording the values displayed by the meters giving the consumption of the product;

calculating the average treatment dose from the ratio of the amount of product drawn out from the storage tank and the water consumption indicated by the meter;

checking that the amount of product available is sufficient for covering the needs of the installation between two successive routine inspections;

carrying out analyses on the water of the hot water circuit and/or of the cold-water circuit at the beginning and at the end of the treatment;

checking the functioning of the unit by rinsing of the hot water installation and/or of the cold-water installation;

modifying the settings, whenever needed.

Finally, these results of these checks are recorded on a form provided for this purpose.

The subsequent maintenance includes inspecting the installation, for example every three months and carrying out the following controls:

analysis of water parameters (determination of the silicates, determination of the total iron, determination of the pH and determination of the DH);

visual checking of the control tubes.

All these control parameters are recorded in a document provided to this end, which makes it possible to determine the periodicity of the inspections of the control tubes and to limit the inspections, when possible, to two yearly inspections after the first year of operation of the treatment unit.

The invention claimed is:

1. Method for treatment against corrosion, oxidation, and/or depositions in domestic water supply circuits comprising the steps of:

carrying out a diagnosis including an analysis of the state of the corrosion, of the oxidation and of the depositions in the domestic water supply circuit as well as an analysis of chemical parameters of the water flowing in said circuit, by sampling the water flowing in said circuit; and carrying out a preventive treatment against corrosion, oxidation and/or depositions in said domestic water supply circuit, implemented by a treatment unit (3), which measures the flow rate of the water entering the domestic water supply circuit (2) and which injects a treatment product comprising silicates, in an amount substantially proportional to the volume of water entering the domestic water supply circuit, but chosen so as not to exceed the limits fixed by food regulations and adjusted on the basis of the results of the analysis of the state of the corrosion, oxidation and/or deposition in the domestic water supply circuit and of chemical parameters of the water flowing in said circuit.

2. Method according to claim 1, wherein said step of diagnosing the state of corrosion or of oxidation is carried out by cutting out a sample of a conduits of said domestic water supply circuit.

3. Method according to claim 1, wherein said step of analysis of the chemical parameters of the water flowing in said circuit is carried out by determining the following chemical parameters: total iron, pH and the DH (degree of hardness).

4. Method according to claim 1, further comprising a starting up phase including a step of carrying out a shock treatment including the daily withdrawal of an amount of water of 10% or more of the capacity of said domestic water supply circuit, preceded and followed by an analysis of chemical parameters of the water flowing in said circuit.

5. Method according to claim 4, wherein the duration of the shock treatment amounts to about three months.

6. Method according to claim 4, wherein the analysis of the chemical parameters includes the determination of the silicates, of the total iron, of the pH and of the DH (degree of hardness).

7. Method according to claim 1, wherein maximum doses of the silicates contained in the treatment product injected into the domestic water supply circuit are such as to have a concentration, respectively, of 10 milligrams per litre in the case of a hot water supply system and of 5 milligrams per litre in the case of a cold water supply system.

8. Method according to claim 1, wherein the temperature of a hot water supply system is controlled at a point (32) intermediate between the point of injection of the treatment product into the circuit and a heat exchanger (6) in order to maintain the temperature of the hot water at about 60° C. or less.

9. Method according to claim 1, wherein a control device (4) is installed in the domestic water supply circuit, which includes a control tube (26) comprised of a tube having a portion with characteristics relating to its diameter, the nature of the material and its wear similar to a conduits of the domestic water supply circuit.

* * * * *